(12) United States Patent
Nagatsu et al.

(10) Patent No.: US 8,930,118 B2
(45) Date of Patent: Jan. 6, 2015

(54) ENGINE CONTROL SYSTEM

(75) Inventors: Kazuhiro Nagatsu, Hiroshima (JP); Masatoshi Hidaka, Higashihiroshima (JP); Takashi Kaminaga, Hatsukaichi (JP); Masahisa Yamakawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 276 days.

(21) Appl. No.: 13/634,740

(22) PCT Filed: Mar. 30, 2011

(86) PCT No.: PCT/JP2011/001891
§ 371 (c)(1),
(2), (4) Date: Sep. 13, 2012

(87) PCT Pub. No.: WO2011/122014
PCT Pub. Date: Oct. 6, 2011

(65) Prior Publication Data
US 2013/0019828 A1    Jan. 24, 2013

(30) Foreign Application Priority Data

Mar. 31, 2010 (JP) ................................. 2010-082552

(51) Int. Cl.
*F01L 1/34* (2006.01)
*F02D 41/30* (2006.01)
*F02D 41/00* (2006.01)
*F02M 25/07* (2006.01)
*F02D 13/02* (2006.01)

(52) U.S. Cl.
CPC ........ *F02D 41/3035* (2013.01); *F02D 41/0002* (2013.01); *F02D 41/006* (2013.01); *F02D 13/0207* (2013.01); *F02D 13/0273* (2013.01); *F02D 2041/001* (2013.01); *Y02T 10/128* (2013.01); *Y02T 10/42* (2013.01); *Y02T 10/47* (2013.01); *Y02T 10/18* (2013.01)
USPC ....................................... 701/103; 123/90.15

(58) Field of Classification Search
USPC ......... 701/103; 123/90.15, 90.11, 90.17, 305, 123/294, 568.21
See application file for complete search history.

(56) References Cited

U.S. PATENT DOCUMENTS 7,290,524 B2    11/2007 Kobayashi
7,360,523 B2 *   4/2008 Sloane et al. .............. 123/90.15
(Continued)

FOREIGN PATENT DOCUMENTS

JP    H11-264319 A    9/1999
JP    2006-144714 A    6/2006
(Continued)

OTHER PUBLICATIONS

The extended European search report issued by the European Patent Office on Jun. 6, 2014, which corresponds to EP11762257.1-1606 and is related to U.S. Appl. No. 13/634,740.
International Search Report; PCT/JP2011/001891; Jun. 7, 2011.

*Primary Examiner* — Hieu T Vo
(74) *Attorney, Agent, or Firm* — Studebaker & Brackett PC

(57) ABSTRACT

Disclosed is an engine control system which is designed to allow homogeneous-charge compression ignition combustion to be performed in an HCCI region (R) defined as an engine operating region including at least a partial-load range of an engine. In a low load zone (R1) of the HCCI region (R), a lift amount of an intake valve (11) is set to a first predetermined value, and an exhaust valve (12) is allowed to start being opened during an intake stroke at a given timing later than an opening timing of the intake valve (11). Further, in the medium load zone of the HCCI region, the lift amount of the intake valve (11) is gradually increased up to a second predetermined value greater than the first predetermined value, along with an increase in an engine load. The engine control system is capable of adequately controlling an amount of burned gas to be introduced into a cylinder, depending on the engine load to allow the HCCI combustion to be adequately performed in a wider engine load range.

5 Claims, 10 Drawing Sheets

(56) References Cited

U.S. PATENT DOCUMENTS 7,370,616 B2 * 5/2008 Kuo et al. .................. 123/90.15
2007/0107680 A1 5/2007 Kobayashi

FOREIGN PATENT DOCUMENTS

| JP | 2007-132319 A | 5/2007 |
| JP | 2010-065639 A | 3/2010 |

* cited by examiner

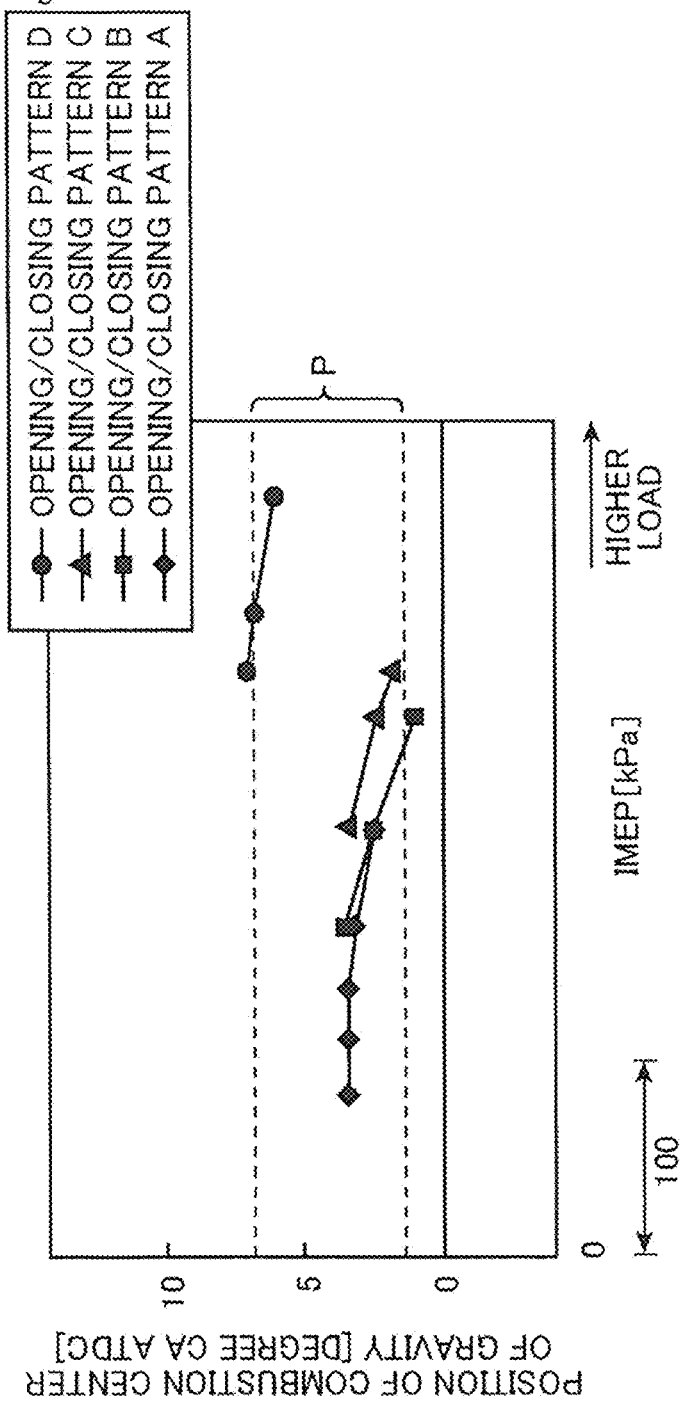

ically set a lift amount of an intake valve, a switching mechanism adapted to be capable of switching between allowing an exhaust valve to be opened both during an exhaust stroke and during an intake stroke and allowing the exhaust valve to be opened only during the exhaust stroke, and a valve controller adapted to drive the variable lift mechanism and the switching mechanism to control respective opening-closing operations of the intake valve and the exhaust valve.

BACKGROUND ART

Heretofore, in the field of gasoline engines, a combustion mode where an air-fuel mixture is forcibly ignited by a spark discharge from a spark plug (spark ignition (SI) combustion) has been commonly employed. Recent years, researches for applying so-called "homogeneous-charge compression ignition (HCCI) combustion" to gasoline engines in place of the SI combustion have been conducted. The HCCI combustion is intended to auto-ignite an air-fuel mixture formed in a cylinder (combustion chamber) of an engine without relying on spark ignition, under a high-temperature/high-pressure environment created by compressing the air-fuel mixture by a piston. The HCCI combustion is a combustion mode in which auto-ignition occurs simultaneously at many positions in the cylinder, and it is assumed that a combustion period thereof becomes shorter and thereby higher thermal efficiency is obtained, as compared with the SI combustion.

In this connection, for example, JP 2007-132319A (hereinafter referred to as "Patent Document 1") proposes a control system for an HCCI engine, which is designed to open an exhaust valve during an intake stroke as well as during an exhaust stroke to allow high-temperature burned gas discharged once to flow back into a cylinder from an exhaust port so as to raise an in-cylinder temperature to promote auto-ignition of an air-fuel mixture.

Based on opening an exhaust valve during an intake stroke to introduce high-temperature burned gas into a cylinder, as in the Patent Document 1, auto-ignition of an air-fuel mixture can be effectively promoted to reliably induce HCCI combustion, particularly, in a low engine load range where an air-fuel mixture is less likely to be auto-ignited. However, if the operation of introducing the burned gas into the cylinder is continuously performed through an engine operating region where an engine load is relatively high (i.e., a fuel injection amount is relatively large), the auto-ignition of the air-fuel mixture is liable to be excessively promoted, which causes abnormal combustion such as preignition.

SUMMARY OF THE INVENTION

In view of the above circumstances, it is an object of the present invention to provide an engine control system capable of adequately controlling an amount of burned gas to be introduced into a cylinder of an engine, depending on an engine load, to allow HCCI combustion to be adequately performed in a wider engine load range.

An engine control system of the present invention is designed to allow homogeneous-charge compression ignition (HCCI) combustion to be performed in an HCCI region defined as an engine operating region including at least a partial-load range of an engine. The engine control system comprises a variable lift mechanism adapted to variably set a lift amount of an intake valve, a switching mechanism adapted to be capable of switching between allowing an exhaust valve to be opened both during an exhaust stroke and during an intake stroke, and allowing the exhaust valve to be opened only during the exhaust stroke, and a valve controller adapted to drive the variable lift mechanism and the switching mechanism to control respective opening/closing operations of the intake valve and the exhaust valve. In the engine control system, the HCCI region is divided into a plurality of load zones including a low load zone, and a medium load zone in which the engine load is higher than in the low load zone. The valve controller is operable, in the low load zone of the HCCI region, to set the lift amount of the intake valve to a first predetermined value and allow the exhaust valve to start being opened during the intake stroke at a given timing later than an opening timing of the intake valve, and, in the medium load zone of the HCCI region, to gradually increase the lift amount of the intake valve up to a second predetermined value greater than the first predetermined value, along with an increase in the engine load.

BRIEF DESCRIPTION OF DRAWINGS

FIG. 11 is a graph showing a measurement result of a position of a combustion center of gravity obtained when intake and exhaust valves were controlled according to each of the opening/closing patterns.

DESCRIPTION OF THE PREFERRED EMBODIMENTS (1) Overall Structure of Engine

Figure 1:
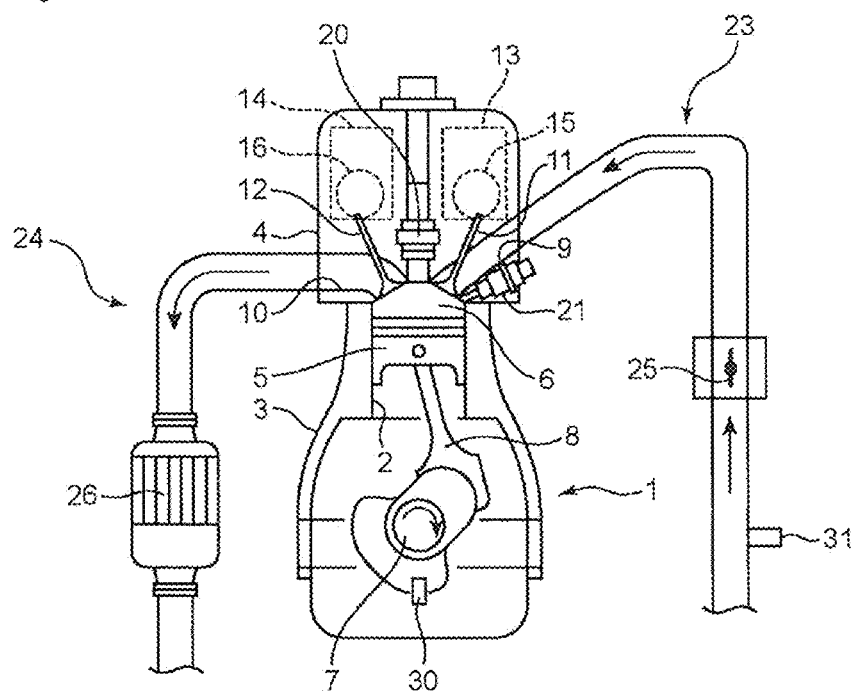
FIG. 1 is a schematic diagram showing an overall structure of an engine employing a control system according to one embodiment of the present invention.

FIG. 1 is a schematic diagram showing an overall structure of an engine employing a control system according to one embodiment of the present invention. The engine illustrated in FIG. 1 is a reciprocating-piston type multicylinder gasoline engine to be mounted as a power source for driving of vehicle running. An engine body 1 of the engine comprises a cylinder block 3 having a plurality of cylinders 2 arranged side-by-side in a direction perpendicular to a surface of the drawing sheet (In FIG. 1, only one of the cylinders 2 is illustrated), a cylinder head 4 provided on an upper surface of the cylinder block 3, and a plurality of pistons 5 each inserted in a perspective one of the cylinders 2 in a reciprocatingly slidable manner. Fuel to be supplied to the engine body 1 may be any type consisting mainly of gasoline. For example, the fuel may consist only of gasoline, or may comprise gasoline and ethanol (ethyl alcohol) or the like contained in the gasoline.

Each of the pistons 5 is connected to a crankshaft 7 through a respective one of a plurality of connecting rods 8, in such a manner that the crankshaft 7 is rotated about its central axis according to a reciprocating movement of the piston 5.

In each of the cylinders 2, a combustion chamber 6 is defined above the piston 5, and the cylinder head 4 is formed with an intake port 9 and an exhaust port 10 each opened to the combustion chamber 6, and provided with an intake valve 11 and an exhaust valve 12 adapted to open and close respective ones of the intake and exhaust ports 9, 10. The illustrated engine is a so-called "double overhead camshaft (DOHC) engine", wherein a pair of the intake valves 11 and a pair of exhaust valves 12 are provided in each of the cylinders 2 (see FIG. 2).

Two valve operating mechanisms 13, 14 each including a respective one of a pair of camshafts (illustration is omitted) is installed in the cylinder head 4, in such a manner that the valve operating mechanism 13 drivingly opens and closes the intake valves 11, and the valve operating mechanism 14 drivingly opens and closes the exhaust valves 12, in conjunction with the rotation of the crankshaft 7.

A CVVL mechanism 15 is incorporated in the valve operating mechanism 13 for the intake valves 11. The CVVL mechanism 15 stands for "Continuous Variable Valve Lift mechanism" which is capable of continuously (steplessly) changing a lift amount (valve-lift amount) of each of the intake valves 11. The CVVL mechanism 15 corresponds to "variable lift mechanism" set forth in the appended claims.

The CVVL mechanism 15 is provided in a manner capable of changing respective lift amounts of all of the intake valves 11 of the engine. Thus, the CVVL mechanism 15 is operable, when it is driven, to simultaneously change respective lift amounts of the pair of intake valves 11 in each of the cylinders 2. Further, the CVVL mechanism 15 is adapted to variably set the valve-lift amount of each of the intake valves 11, while fixing an opening timing (valve-opening timing) of the intake valve 11 at a given crank angle position. Therefore, when the valve lift amount is changed by the CVVL mechanism 15, a peak-lift timing (an crank angle position where the valve-lift amount is maximized) is shifted accordingly (see FIGS. 6 and 7).

This type of CVVL mechanism has already been publicly known, and a specific structure thereof is disclosed, for example, in JP 2007-85241A (in this document, it is referred to as VVE").

A VVL mechanism 16 (which corresponds to "switching mechanism" set forth in the appended claims) is incorporated in the valve operating mechanism 14 for the exhaust valves 14. The VVL mechanism 16 stands for "Variable Valve Lift mechanism" which is an on/off type adapted to selectively activate and deactivate a function of pushing down each of the exhaust valves 12 during an intake stroke. Specifically, the VVL mechanism 16 has a function of allowing the exhaust valve 12 to be opened both during an exhaust stroke and during the intake stroke and switching between execution and stopping of a valve-opening operation of the exhaust valve 12 during the intake stroke.

As used in this specification, the term "xx valve is opened during yy stroke" or "xx valve to be opened during yy stroke" means that a valve-open period of the xx valve (a time period after the xx valve starts being opened through until it is closed) is set to be mainly overlapped with the yy stroke, but it does not mean that the entire valve-open period is essentially included in the yy stroke. In contrast, for example, the term "xx valve starts being opened during yy stroke" or "valve-opening operation of xx valve starts during yy stroke" literally means that an opening timing (valve-opening start timing) of the xx valve is set at a given timing within the yy stroke.

For example, the term "the exhaust valve 12 is opened during the exhaust stroke" or "the exhaust valve 12 to be opened during the exhaust stroke" means that an open period of the exhaust valve 12 mainly overlaps the exhaust stroke. More specifically, an after-mentioned pattern where the exhaust valve 12 starts being opened slightly before the exhaust stroke (in a last phase of an expansion stroke) and is then closed at a timing adjacent to a top dead center of the exhaust stroke (exhaust TDC), as in the lift curves EX1, EX2 illustrated in FIGS. 6 to 9, fits this definition. Further, for example, the term "the exhaust valve 12 starts being opened during the intake stroke" or "valve-opening operation of the exhaust valve 12 starts during the intake stroke" means that an opening timing (valve-opening start timing) of the exhaust valve 12 is set within a time period of the intake stroke, as in after-mentioned lift curves EX1$a$, EX2$a$ in FIGS. 6 and 7.

The on/off type VVL mechanism 16 is provided in association with all of the exhaust valves 12 of the engine, and adapted, with respect to the pair of the exhaust valves 12 in each of the cylinders 2, to selectively execute and stop the valve-opening operation of a respective one of the pair of the exhaust valves 12 during the intake stroke, independently.

For example, the above function of the VVL mechanism 16 may be achieved by providing a sub-cam for pushing down the exhaust valve 12 during the intake stroke in addition to a normal cam for driving the exhaust valve 12 (i.e., a cam for pushing down the exhaust valve 12 during the exhaust stroke), and a so-called lost motion mechanism for cancelling a driving force of the sub-cam to be transmitted to the exhaust valve 12, in such a manner that they are associated with each of the exhaust valves 12, independently. This type of VVL mechanism has already been publicly known, and a specific structure thereof is disclosed, for example, in the JP 2007-85241A (in this document, it is referred to as "valve-operation switching mechanism").

Figure 2:
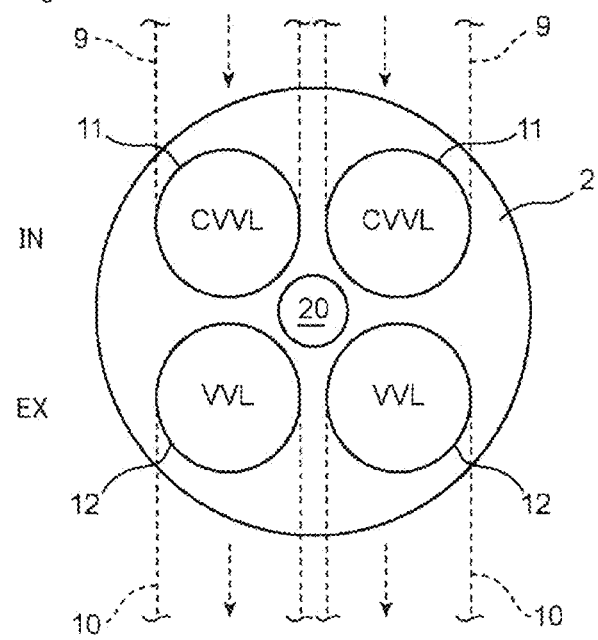
FIG. 2 is a schematic diagram showing a type of variable mechanism associated with intake and exhaust valves of the engine.

FIG. 2 collectively shows types of variable mechanisms associated with the intake and exhaust valves 11, 12. As mentioned above, in this embodiment, in each of the cylinders 2, both of the pair of intake valves 11 are associated with the CVVL mechanism 15 capable of continuously changing the valve-lift amount, and both of the pair of the exhaust valves 12 are associated with the on/off type VVL mechanism 16 adapted to selectively execute and stop the valve-opening operation during the intake stroke.

Returning to FIG. 1, the cylinder head 4 of the engine body 1 is provided with a spark plug 20 and an injector 21 in pairs for each of the cylinders 2.

The injector 21 is provided to be exposed to the combustion chamber 6 from a lateral side of an intake-side region thereof, and adapted to receive fuel (which consists mainly of gasoline) from a non-illustrated fuel supply pipe, and inject the fuel from a distal end thereof into the combustion chamber 6. Specifically, the injector 21 is operable to inject the fuel into the combustion chamber 6, for example, in the intake stroke of the engine, so as to mix the injected fuel with air to form an air-fuel mixture having a desired air/fuel ratio in the combustion chamber 6.

The spark plug 20 is provided to be exposed to the combustion chamber 6 from thereabove, and adapted to generate a spark discharge at a distal end thereof in response to power feeding from a non-illustrated ignition circuit.

A geometric compression ratio of the above engine body 1 is set to 15 or more. Specifically, while typical gasoline engines have a geometric compression ratio of about 9 to 11, the geometric compression ratio of the engine body 1 in this embodiment is set to a high value of 15 or more.

An intake passage 23 and an exhaust passage 24 are connected to respective ones of a group of the intake ports 9 and a group of the exhaust ports 10 of the engine body 1. Specifically, external intake air (flesh air) is supplied to the combustion chamber 6 via the intake passage 23, and burned gas (exhaust gas) produced in the combustion chamber 6 is discharged to an outside of the engine via the exhaust passage 24.

The intake passage 23 is provided with a throttle valve 25. The throttle valve 25 is comprised of an electronically-controlled throttle valve which is not interlocked with a non-illustrated accelerator pedal to be operated (depressed) by a driver.

The exhaust passage 24 is provided with a catalytic converter 26 for purifying exhaust gas. For example, the catalytic converter 26 houses a three-way catalyst to purify harmful components contained in exhaust gas passing through the exhaust passage 24 by an action of the three-way catalyst.

(2) Control System

Figure 3:
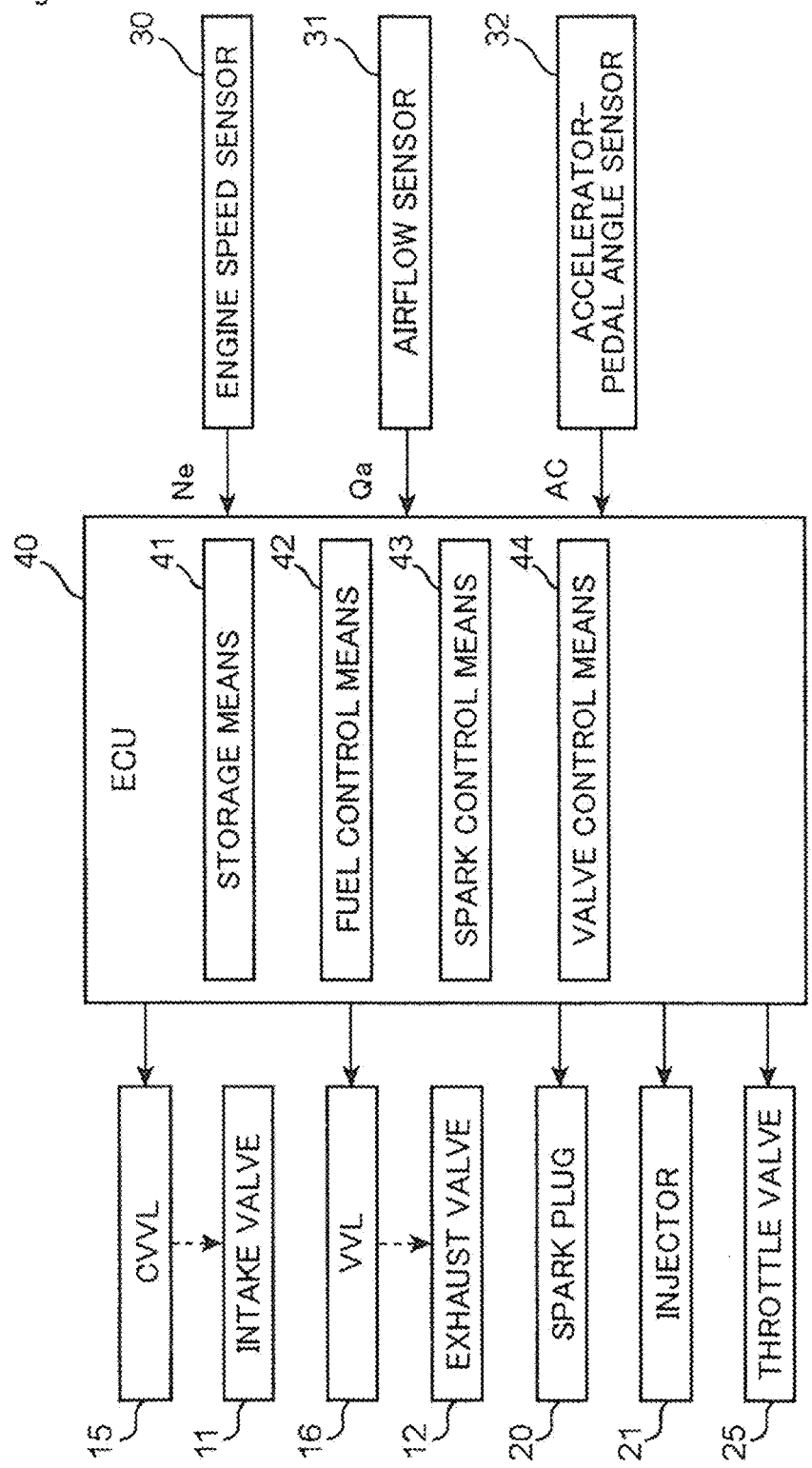
FIG. 3 is a block diagram showing the control system of the engine.

FIG. 3 is a block diagram showing a control system of the engine. An ECU 40 illustrated in FIG. 3 is a device for comprehensively controlling various sections of the engine, and comprised of conventional components, such as a CPU, a ROM and a RAM.

A plurality of detection signals from various sensors are input into the ECU 40. Specifically, the ECU 40 is electrically connected to each of an engine speed sensor 30 for detecting an engine speed Ne, an airflow sensor 31 for detecting an amount Qa of intake air passing through the intake passage 23, and an accelerator-pedal angle sensor 32 for detecting an angle AC of the non-illustrated accelerator pedal, and adapted to successively receive an input of respective detection values detected by the sensors 30 to 32, in the form of an electric signal.

Further, the ECU 40 is electrically connected to each of the CVVL mechanism 15, the VVL mechanism 16, the spark plug 20, the injector 21 and the throttle valve 25, and adapted to output a driving control signal to each of these components.

Specific functions of the ECU 40 will be described below. As major functional elements, the ECU 40 has storage means 41, fuel control means 42, spark control means 43, and valve control means (valve controller) 44.

Figure 4:
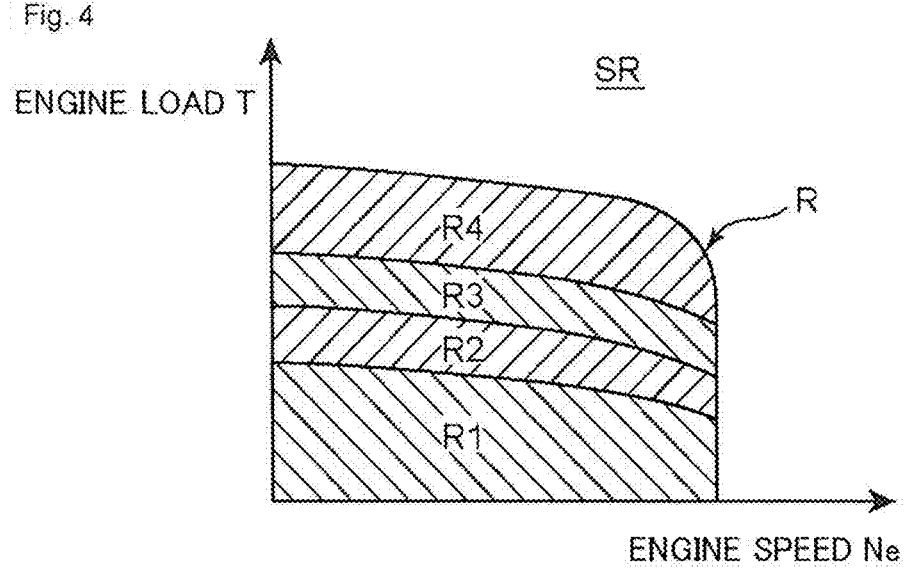
FIG. 4 is a chart showing one example of an engine operating region map used in the control system.

The storage means 41 is designed to store various data and programs necessary for controlling the engine. As one example of the data, an engine operating region map illustrated in FIG. 4 is stored in the storage means 41. The engine operating region map is designed to define in what kind of modes the engine should be operated depending on the engine speed Ne and an engine load T (required torque).

In the engine operating region map illustrated in FIG. 4, an HCCI region R is set in a partial-load range of the engine. In the HCCI region R, HCCI (Homogeneous-Charge Compression Ignition) combustion where an air-fuel mixture is auto-ignited in the combustion chamber 6 is performed. Further, the HCCI region R is divided into four sub-regions R1 to R4 according to the engine load. The four sub-regions R1 to R4 will hereinafter be referred to as "first load zone R1", "second load zone R2", "third load zone R3" and "fourth load zone R4", in ascending order of the engine load. In the first to fourth load zones R1 to R4, the HCCI combustion is performed therethroughout, while changing an opening/closing control pattern of the intake and exhaust valves 11, 12, in each of the load zones (details of the control will be described later).

In a correspondence relation with the terms in the appended claims, the first load zone R1, the second load zone R2, the third load zone R3 and the fourth load zone R4 correspond to "low load zone", "first medium load zone", "second medium load zone" and "high load zone" set forth in the appended claims, respectively.

The fuel control means 42 is designed to control an injection amount and an injection timing of fuel to be injected from the injector 21 into the combustion chamber 6. More specifically, the fuel control means 42 is operable to calculate a target fuel injection amount and a target fuel injection timing, based on information about the engine speed Ne input from the engine speed sensor 30, the intake air amount Qa input from the airflow sensor 31, etc., and control a valve-opening timing and a valve-open period of the injector 21, based on a result of the calculation.

The spark control means 43 is designed to output a power feed signal to the ignition circuit of the spark plug 20 at a given timing preliminarily set depending on an engine operating state so as to control a timing of spark discharge (spark timing) of the ignition plug 16, etc. In this embodiment, the HCCI combustion where an air-fuel mixture is auto-ignited without relying on spark ignition, is performed at least in the HCCI region R illustrated in FIG. 4. Thus, during a period for performing the HCCI combustion, the spark discharge from the spark plug 20 is fundamentally stopped.

The valve control means 44 is designed to drive the CVVL mechanism 15 to variably set the lift amount of each of the intake valves 22, and simultaneously drive the VVL mechanism 16 to execute or stop the valve-opening operation of each of the exhaust valves 12 during the intake stroke. Particularly, in the HCCI region R, the valve control means 44 has a function of, based on the above control for the intake and exhaust valves 11, 12, adjusting an amount of fresh air to be introduced into each of the cylinders 2, and switching whether or not burned gas is introduced into each cylinder to adjust an in-cylinder temperature.

Specifically, based on changing the lift amount of the intake valve 11, an amount of fresh air to be introduced into the cylinder 2 through the intake port 9 is adjusted. Further, based on executing or stopping the valve-opening operation of the exhaust valve 12 during the intake stroke, whether or not the backflow of burned gas into the cylinder 2 occurs is selected to adjust the rising amount of the in-cylinder temperature. For example, when the exhaust valve 12 is opened during the intake stroke, high-temperature burned gas (exhaust gas) discharged to the exhaust port 10 once is sucked to flow back from the exhaust port 10 and re-introduced into the cylinder to cause a rise in the in-cylinder temperature. In addition, when such backflow of burned gas occurs, a flow of fresh air from the intake port 9 is restricted to cause a reduction in amount of fresh air to be introduced into the cylinder 2 (in-cylinder fresh-air amount). On the other hand, when the valve-opening operation of the exhaust valve 12 during the intake stroke is deactivated, the backflow of burned gas is stopped, so that the in-cylinder temperature is relatively lowered, and the in-cylinder fresh-air amount is increased. The above operation of causing burned gas to flow back into the cylinder is called "internal EGR (internal Exhaust Gas Recirculation). Thus, in the following description, burned gas to be controlled to flow back into the cylinder will be referred to as "internal EGR gas" on a case-by-case basis.

The valve control means 44 undertakes a roll of, based on the above control for the intake and exhaust valves 11, 12, adequately adjusting an amount of the internal EGR gas (internal EGR amount) and the in-cylinder fresh-air amount to allow an air-fuel mixture to be reliably auto-ignited at an adequate timing in the combustion chamber 6 so as to continuously perform the HCCI combustion in a stable manner, even when the engine is operated in any of the load zones R1 to R4 of the HCCI region R.

As described above, in the HCCI region R, the in-cylinder fresh-air amount is adjusted based on the control for the intake and exhaust valves 11, 12 by the valve control means 44. Thus, it is fundamentally unnecessary to perform a control operation of opening and closing the intake passage 23 by the throttle valve 25, and a degree of opening of the throttle valve 25 is maintained just or approximately in a fully opened state (100%), except in the event of emergency stop of the engine or the like.

A combustion control operation in an engine operation region other than the HCCI region R (first to fourth load zones R1 to R4) will be briefly described below. In the following description, the engine operation region other than the HCCI region R, i.e., a region defined by combining an engine speed range on a high engine speed side with respect to the HCCI region R, and an engine load range on a high engine load side with respect to the HCCI region R, will be referred to as "region SR". In the region SR, spark ignition (SI) combustion or HCCI combustion different in methodology from that in the HCCI region R is performed.

For example, in the engine speed range on the high engine speed side with respect to the HCCI region R, a heat receiving period of fuel is short, and thereby it is difficult to induce auto-ignition of an air-fuel mixture in the combustion chamber 6. Therefore, the HCCI combustion is switched to a forcible combustion (SI combustion) based on spark discharge using the spark plug 20.

Further, on the high engine load side with respect to the HCCI region R, the HCCI combustion may be switched to the SI combustion in the same manner as the control on the high engine speed side. However, for example, in cases where the engine is a supercharged engine, the HCCI combustion may be continued under a condition that deficiency in the in-cylinder fresh-air amount is corrected by supercharging, while largely shifting the opening timing of the intake valve 11 with respect to a bottom dead center of the intake stroke (intake BDC) to reduce an effective compression ratio of the engine. Specifically, on the high engine load side with respect to the HCCI region R, even if the fuel injection amount is simply increased, abnormal combustion such as preignition is likely to occur. However, based on performing supercharging while reducing the effective compression ratio of the engine, an internal temperature of the combustion chamber 6 around a top dead center of a compression stroke (compression TDC) can be lowered while sufficiently ensure the in-cylinder fresh-air amount. Thus, even on the high engine load side with respect to the HCCI region R, the HCCI combustion can be continued without causing preignition or the like.

However, in the present invention, a combustion control operation to be performed in the region SR other than the HCCI region R is not particularly limited. Thus, in the following description, only a control operation in the HCCI region R will be described.

(3) Control Operation in HCCI Region R

With reference to FIGS. 5 to 9, details of the control operation in the HCCI region R will be described below. Among FIGS. 5 to 9, FIG. 5 is a flowchart showing steps of a control process to be executed, and FIGS. 6 to 9 are charts showing opening/closing patterns of the intake and exhaust valves 11, 12 to be selected in respective ones of the load zones R1 to R4 of the HCCI region R.

Figure 5:
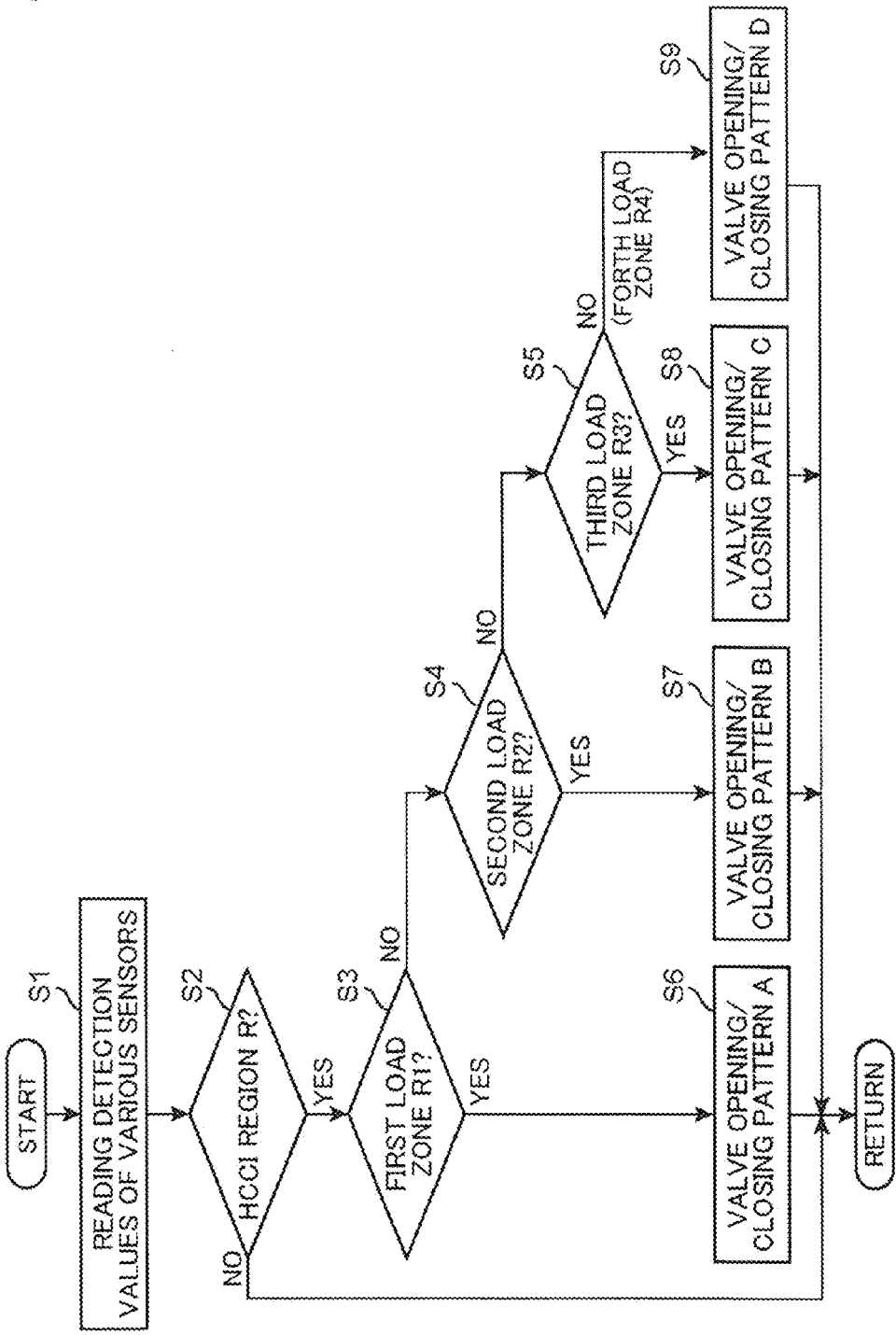
FIG. 5 is a flowchart showing steps of a control operation to be executed in the control system.

Upon start of a processing routine in the flowchart illustrated in FIG. 5, the ECU 40 firstly executes a control operation of reading respective detection values of the sensors (Step S1). More specifically, respective values of the engine speed Ne, the intake air amount Qa and the accelerator-pedal angle AC are read from corresponding ones of the engine speed sensor 30, the airflow sensor 31 and the accelerator-pedal angle sensor 32, and input into the ECU 40.

Then, the ECU 40 executes a control operation of determining whether an engine operating point defined based on the information read in the Step S1 falls within the HCCI region R illustrated in FIG. 4 (Step S2). More specifically, it is determined whether both of the value of the engine speed Ne read in the Step S1, and a value of the engine load (required torque) T calculated from the value of the accelerator-pedal angle AC, etc., read in the Step S1, fall within the HCCI region R in FIG. 4.

When the determination in the Step S2 is YES, i.e., it is ascertained that the engine operating point falls within the HCCI region R, the ECU 40 further executes a control operation of determining whether the engine operating point falls within the first load zone R1 of the HCCI region R (Step S3).

When the determination in the Step S3 is YES, i.e., it is ascertained that the engine operating point falls within the first load zone R1 of the HCCI region R, the process advances to Step S6. In the Step S6, the ECU 40 executes a control operation of drivingly opening and closing the intake and exhaust valves 11, 12 according to a predefined opening/closing pattern A.

Figure 6:
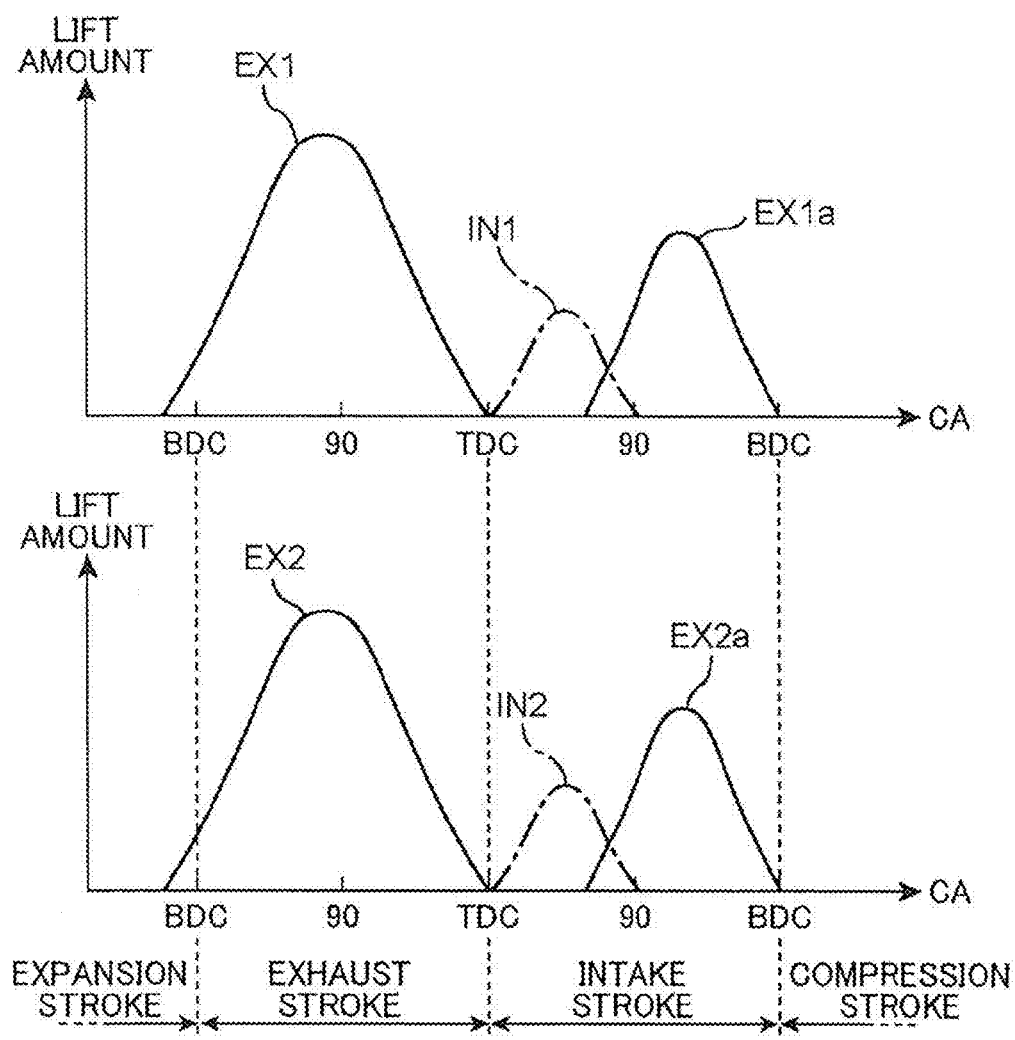
FIG. 6 is an explanatory chart showing details of an intake/exhaust valve opening/closing pattern A to be executed in a first load zone R1 in FIG. 4.

FIG. 6 shows respective lift curves of the intake and exhaust valves 11, 12 based on the opening/closing pattern A. In FIG. 6, IN1 indicates a lift curve of one of the pair of intake valves 11 provided in each of the cylinders 2, in a state when it is opened during the intake stroke, and IN2 indicates a lift curve of the other intake valve 11 in a state when it is opened during the intake stroke. EX1 indicates a lift curve of one of the pair of exhaust valves 12 provided in each of the cylinders 2, in a state when it is opened during the exhaust stroke, and EX2 indicates a lift curve of the other exhaust valve 12 in a state when it is opened during the exhaust stroke. Further, EX1*a* indicates a lift curve of the one exhaust valve 12 in a state when it is opened during the intake stroke, and EX2*a* indicates a lift curve of the other exhaust valve 12 in a state when it is opened during the intake stroke. An opening timing (valve-opening start timing) and a closing timing (valve-closing end timing) in the lift curve of each of the intake and exhaust valves 11, 12 are illustrated based on an assumption that an interval of a lift curve, except for ramp areas (buffer areas where the valve-lift amount gently rises and falls), is defined as the valve-open period. Thus, they do not mean timings when each of the lift amounts of the intake and exhaust valve 11, 12 strictly becomes zero. The same applies to after-mentioned lift curves in FIGS. 7 to 9.

As shown in FIG. 6, in the opening/closing pattern A to be selected in the first load zone R1, both of the pair of exhaust valves 12 in each of the cylinders 2 are opened during the exhaust stroke (EX1, EX2), and further opened during the intake stroke (EX1a, EX2a). During this valve-opening operation, both of the pair of intake valves 11 in each of the cylinders 2 are opened during the intake stroke in a relatively small lift amount (IN1, IN2). The valve control means 44 is operable, according to the valve opening/closing pattern set in the above manner, to control the driving of the CVVL mechanism 15 and the VVL mechanism 16. The lift amount of each of the intake valves 11 in the opening/closing pattern A corresponds to "first predetermined value" set forth in the appended claims.

More specifically, in the opening/closing pattern A, the intake valve 11 starts being opened around the exhaust TDC (TDC in FIG. 6), and is then closed at about 90 degrees crank angle (CA) after the exhaust TDC. In other words, the lift amount of the intake valve 11 is set to a relatively small value, so that the valve-open period of the intake valve 11 is shortened, and thereby the intake valve 11 is closed at a fairly early timing of about 90 degrees CA after the exhaust TDC. Based on setting the lift amount and the valve-open period of the intake valve 11 to relatively small values in the above manner, a flow of fresh air from the intake port 9 is restricted to allow the in-cylinder fresh-air amount to be reduced.

On the other hand, each of the exhaust valves 12 starts being opened around a bottom dead center of the expansion stroke (expansion BDC) (BDC on a left side of FIG. 6), and is then closed around the exhaust TDC (EX1, EX2). Subsequently, the exhaust valve 12 starts being re-opened at a given timing later than the exhaust TDC, and is then closed around the intake BDC (BDC on a right side of FIG. 6) (EX1a, EX2a). Based on re-opening the exhaust valve 12 during the intake stroke in the above manner, high-temperature burned gas discharged from the exhaust port 10 once are returningly introduced into the cylinder 2. Thus, based on an interaction of the backflow of the burned gas and the small lift amount of the intake valve 11, the in-cylinder fresh-air amount is significantly reduced, and a rate of burned gas flowing back into the cylinder 2 (internal EGR gas) is increased, so that the in-cylinder temperature is significantly raised.

In the opening/closing pattern A illustrated in FIG. 6, a given delay time occurs in a timing when the exhaust valve 12 starts being re-opened after it is closed around the exhaust TDC, because a ramp area of the lift curve exists therebetween. Specifically, as mentioned above, a ramp area having a gradual change in the valve-lift amount exists in each skirt region of a valve lift curve, and a period of the ramp area is not included in the valve-open period. Thus, when the exhaust valve 12 is re-opened after it is closed once, it is necessary to set a given delay time therebetween. If the ramp area is substantially eliminated to reduce such a delay time, a problem such as jumping (a phenomenon that a valve exhibits a behavior, like leaping, during seating) will occurs.

Therefore, in the embodiment illustrated in FIG. 6, the exhaust valve 12 is designed such that it is closed around the exhaust TDC after being opened during the exhaust stroke, and then starts being re-opened at about 50 degrees CA after the exhaust TDC. Based on ensuring a sufficient delay time before re-opening the exhaust valve 12, the exhaust valve 12 can be adequately opened and closed, while avoiding the problem such as jumping.

Further, as a result of setting a timing of the re-opening of the exhaust valve 12 in the above manner (at about 50 degrees CA after the exhaust TDC), a peak-lift timing of the exhaust valve 12 opened during the intake stroke is located in a later phase of the intake stroke (at a timing later than 90 degrees CA after the exhaust TDC). Specifically, the exhaust valve 12 to be opened during the intake stroke (EX1a, EX2a) starts being opened in an earlier phase of the intake stroke, and has a peak lift in the later phase of the intake stroke, whereafter it is closed around the intake BDC.

As mentioned above, the intake valve 11 starts being opened around the exhaust TDC, and is then closed at about 90 degrees CA after the exhaust TDC (IN1, IN2). Thus, during the intake stroke, the intake valve 11 and the exhaust valve 12 are opened while being offset in phase to each other in such a manner that respective valve-open periods thereof partially overlap. In other words, the exhaust valve 12 stars being opened at a timing within the valve-open period of the intake valve 11 (i.e., a time period after the intake valve starts being opened through until it is closed). Then, the exhaust valve 12 is closed after the intake valve 11 is closed.

Further, respective lift amounts of the intake valve 11 and the exhaust valve 12 are set such that the lift amount of the intake valve 11 (a maximum height of each of IN1 and IN2) is less than the lift amount of the exhaust valve 12 opened during the intake stroke (a maximum height of each of EX1a and EX2a).

Returning to the flowchart in FIG. 5, a control operation to be executed when the determination in the Step S3 is made as NO, will be described. In this case, the ECU 40 executes a control operation of determining whether the current engine operating point falls within the second load zone R2 in FIG. 4 (Step S4). When the determination in the Step S4 is YES, i.e., it is ascertained that the current engine operating point falls within the second load zone R2, the process advances to Step S7. In the Step S7, the ECU 40 executes a control operation of drivingly opening and closing the intake and exhaust valves 11, 12 according to a predefined opening/closing pattern B.

Figure 7:
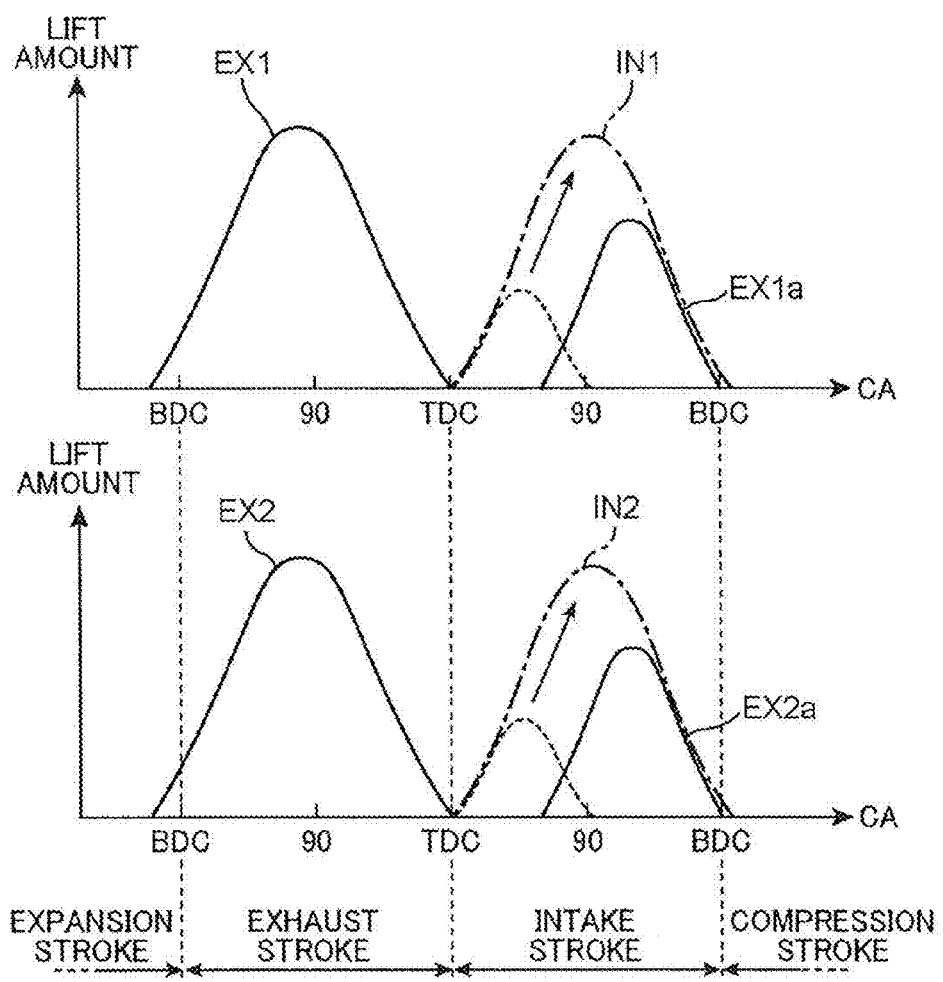
FIG. 7 is an explanatory chart showing details of an intake/exhaust valve opening/closing pattern B to be executed in a second load zone R2 in FIG. 4.

FIG. 7 shows respective lift curves of the intake and exhaust valves 11, 12 based on the opening/closing pattern B. As shown in FIG. 7, in the opening/closing pattern B to be selected in the second load zone R2, each of the lift amounts (IN1, IN2) of the pair of intake valves 11 in each of the cylinders 2 is set to be greater than that in the opening/closing timing A (FIG. 6) to be selected in the first load zone R1. More specifically, the valve control means 44 drives the CVVL mechanism 15 in a direction for causing an increase in lift amount, so that each of the lift amounts of the pair of the intake valves 11 is gradually changed to a larger value as indicated by the arrowed line in FIG. 7. Consequently, an amount of fresh air flowing into the cylinder 2 from the intake ports (in-cylinder fresh-air amount) is increased, and an amount of burned gas flowing back into the cylinder 2 (internal EGR gas) is reduced. A remaining part of the valve operation is the same as that in the opening/closing pattern A.

More specifically, in the opening/closing pattern B, the lift amount of each of the intake valves 11 is gradually increased along with an increase in the engine load. Then, when the engine load increases up to a value close to a boundary between the second load zone R2 and the third load zone R3, the lift amount of the intake valve 11 (IN1, IN2) finally becomes greater than the lift amount of each of the exhaust valves 12 opened during the intake stroke (EX1a, EX2a), as shown in FIG. 7. During this operation, the opening tinning (valve-opening start timing) of the intake valve 11 is fixed around the exhaust TDC. Thus, as the lift amount of the intake valve 11 becomes larger, a position of a peak lift (peak-lift position) and a closing timing of the intake valve 11 are gradually shifted toward a retard side. Then, when the lift amount is maximized, the closing timing of the intake valve 11 is retarded to a position close to the intake BDC (BDC on a right side of FIG. 7).

In the embodiment illustrated in FIG. 7, the lift amount of the intake valve 11 is increased until it becomes greater than the lift amount of the exhaust valve 12 opened during the intake stroke. However, a maximum value of the lift amount of the intake valve 11 may be set to be equal to the lift amount of the exhaust valve 12 opened during the intake stroke, at a minimum. The maximum value of the lift amount of the intake valve 11 corresponds to "second predetermined value" set forth in the appended claims.

A control operation to be executed when the determination in the Step S4 illustrated in FIG. 5 is made as NO, will be described below. In this case, the ECU 40 executes a control operation of determining whether the current engine operating point falls within the third load zone R3 in FIG. 4 (Step S5). When the determination in the Step S5 is YES, i.e., it is ascertained that the current engine operating point falls within the third load zone R3, the process advances to Step S8. In the Step S8, the ECU 40 executes a control operation of drivingly opening and closing the intake and exhaust valves 11, 12 according to a predefined opening/closing pattern C.

Figure 8:
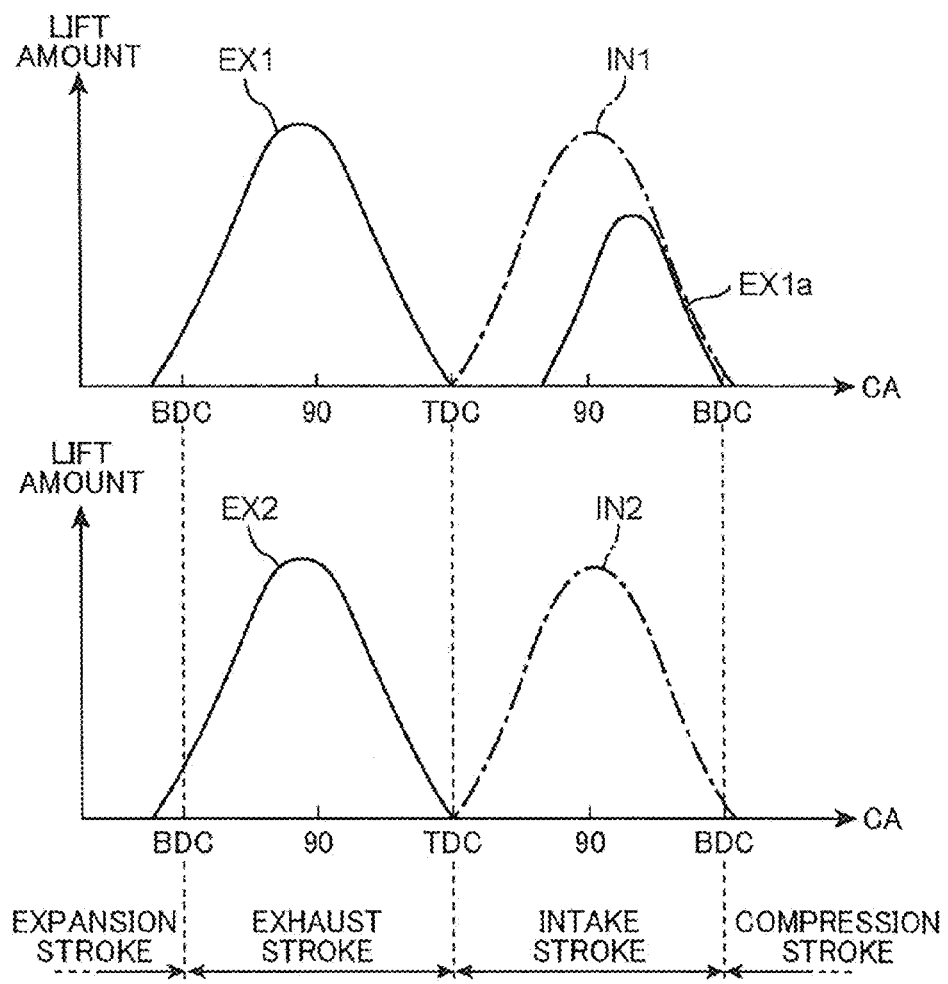
FIG. 8 is an explanatory chart showing details of an intake/exhaust valve opening/closing pattern C to be executed in a third load zone R3 in FIG. 4.

FIG. 8 shows respective lift curves of the intake and exhaust valves 11, 12 based on the opening/closing pattern C. As shown in FIG. 8, in the opening/closing pattern C to be selected in the third load zone R3, only a first one of the pair of exhaust valves 12 provided in each of the cylinders 2 is opened during the intake stroke, and the other, second, exhaust valve 12 is not opened during the intake stroke. Specifically, the function of driving the VVL mechanism 16 by the valve control means 44 to push down the second exhaust valve 12 during the intake stroke is disenabled, so that the second exhaust valve 12 is opened only during the exhaust stroke (EX2) without being opened during the intake stroke.

In contrast, the first exhaust valve 12 is opened both during the exhaust stroke and during the intake stroke (EX1, EX1a). Based on reducing the number of the exhaust valves 12 to be opened per cylinder during the intake stroke, from two to one in the above manner, the internal EGR amount is reduced, and the in-cylinder fresh-air amount is increased. A remaining part of the valve operation is the same as that in the opening/closing pattern B.

A control operation to be executed when the determination in the Step S5 is made as NO, will be described. In this case, it can be automatically ascertained that the current engine operating point falls within the fourth load zone R4 in FIG. 4. Then, in Step S 9, the ECU 40 executes a control operation of drivingly opening and closing the intake and exhaust valves 11, 12 according to a predefined opening/closing pattern D.

Figure 9:
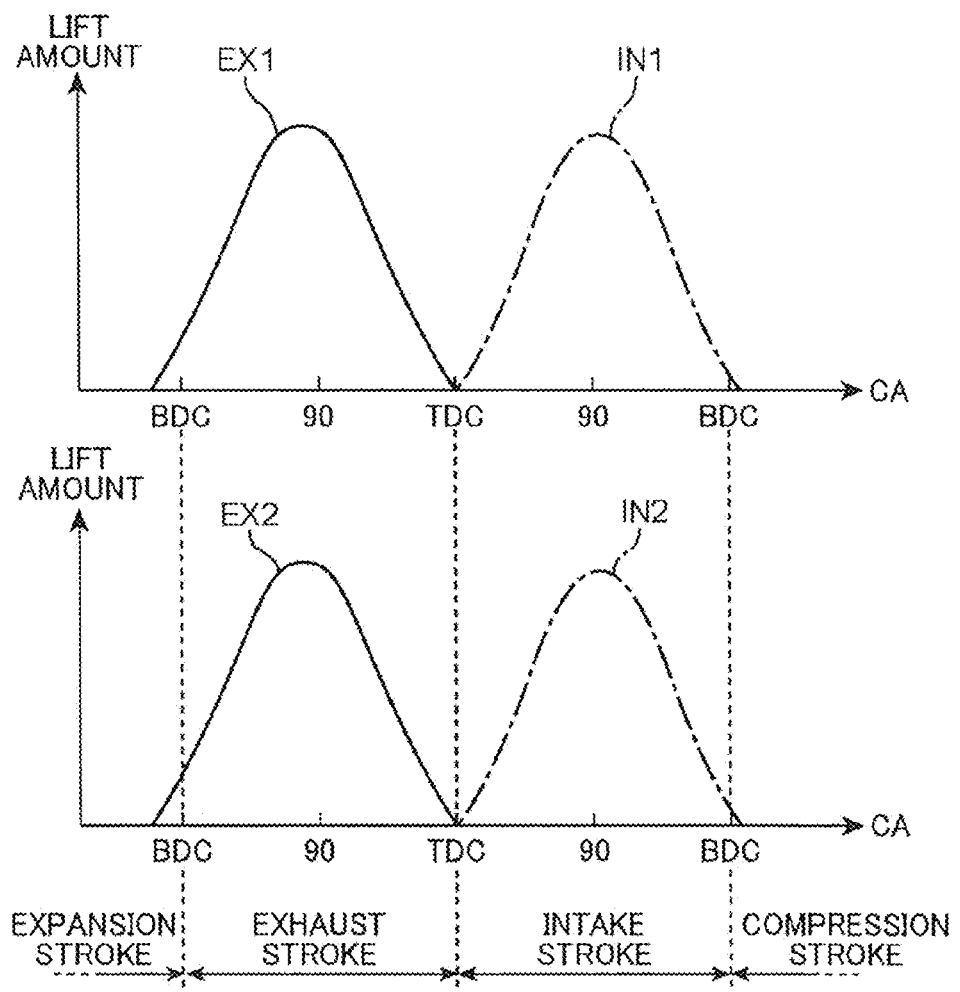
FIG. 9 is an explanatory chart showing details of an intake/exhaust valve opening/closing pattern B to be executed in a fourth load zone R4 in FIG. 4.

FIG. 9 shows respective lift curves of the intake and exhaust valves 11, 12 based on the opening/closing pattern D. As shown in FIG. 9, in the opening/closing pattern D to be selected in the fourth load zone R4, the valve-opening operation during the intake stroke is inhibited in both of the pair of exhaust valves 12 provided in each of the cylinders 2. Specifically, the function of driving the VVL mechanism 16 by the valve control means 44 to push down the pair of exhaust valves 12 during the intake stroke is fully disenabled. Consequently, the pair of exhaust valves 12 in each of the cylinders 2 are opened only during the exhaust stroke (EX1, EX2) without being opened during the intake stroke. Based on setting the number of the exhaust valves 12 to be opened per cylinder during the intake stroke, to zero, in the above manner, the internal EGR amount becomes almost zero, and the in-cylinder fresh-air amount is sufficiently ensured. A remaining part of the valve operation is the same as that in the opening/closing pattern C.

(4) Functions/Effects

As described above, in the above embodiment, in the engine provided with the pair of intake valves 11 and the pair of exhaust valves 12 in each of the cylinders 2, wherein the HCCI region R to be operated in the HCCI combustion mode is set in the partial-load range, the HCCI region R is divided into the first to fourth load zones R1 to R4 in ascending order of the engine load, and the intake and exhaust valves 11, 12 are controlled in each of the load zones according to a corresponding one of the opening/closing patterns as shown in FIGS. 6 to 9. In the above engine control system, the internal EGR amount can be adequately controlled depending on the engine load so as to allow the HCCI combustion to be adequately performed in a wider engine load range.

For example, in the first load zone R1 where the engine load is lowest in the HCCI region R, both of the pair of exhaust valves 12 are opened during the intake stroke, and the lift amount of each of the intake valves 11 is set to be less than the lift amount of each of the exhaust valves 12 opened during the intake stroke (see FIG. 6), so that it becomes possible to ensure a large amount of high-temperature burned gas flowing back into the cylinder 2 (internal EGR gas), to relatively reduce a ratio of fresh air to a total gas amount in the cylinder 2. Consequently, the in-cylinder temperature is significantly raised to create an environment where an air-fuel mixture is more likely to be auto-ignited in the combustion chamber 6. This makes it possible to reliably induce the HCCI combustion even in a situation where the engine load is low and thereby the fuel injection amount is small. Additionally, the introduction of a large amount of internal EGR gas provides an additional advantages of being able to lower an in-cylinder negative pressure so as to effectively reduce pumping loss.

However, if the introduction of a large amount of internal EGR gas is continued even after the engine load increases to a certain level, the in-cylinder fresh-air amount becomes deficient, and the auto-ignition of the air-fuel mixture is excessively promoted, which is likely to cause the occurrence of abnormal combustion such as so-called preignition, i.e., a phenomenon that the air-fuel mixture self-ignites at an abnormally early timing. Therefore, in order to avoid such a situation, in the above embodiment, in an engine load range on the high engine load side with respect to the first load zone R1 (in the second to fourth load ranges R2 to R4), a ratio between the internal EGR gas and the in-cylinder fresh air is appropriately adjusted depending on the engine load by increasing the lift amount of each of the intake valves 11 and reducing the number of the exhaust valves 12 to be opened during the intake stroke.

More specifically, in the second load zone R2 in which the engine load is closest to and higher than that in the first load zone R1, the lift amount of each of the intake valves 11 is increased along with an increase in the engine load (see FIG. 7) to promote a flow of fresh air into the cylinder so as to gradually increase the in-cylinder fresh-air amount and reduce the internal EGR amount. This makes it possible to reduce the in-cylinder temperature as compared with that in the first load zone R1 so as to allow the HCCI combustion to be continuously performed in an adequate manner, while facilitating a reduction in pumping loss.

Then, when the engine load increases to the third load zone R3 in which the engine load is higher than in the second load zone R2, the number of the exhaust valves 12 to be opened during the intake stroke is reduced from two to one (see FIG. 8), so that it becomes possible to further reduce the internal EGR amount so as to lower the in-cylinder temperature as compared with that in the second load zone R2.

Then, when the engine load increases to the fourth load zone R4 having a highest engine load in the HCCI region R, the valve-opening operation during the intake stroke is inhibited in all of the exhaust valves 12 to set the number of the exhaust valves 12 to be opened during the intake stroke, to zero (see FIG. 9), so that it becomes possible to stop backflow of burned gas (internal EGR) so as to significantly increase an amount of fresh air flowing into the cylinder 2. This provides an advantages of being able to sufficiently ensure the in-cylinder fresh-air amount suitable for a high engine load, and suppress the in-cylinder temperature at a low level so as to effectively prevent abnormal combustion such as preignition.

In the above embodiment, the exhaust valve 12 to be opened during the intake stroke is driven to have a peak lift in the later phase of the intake stroke, so that the exhaust valve 12 is largely opened at a timing when the cylinder is more likely to have a negative pressure. This makes it possible to efficiently introduce internal EGR gas into the cylinder 2. Further, a certain delay time is provided before the exhaust valve 12 starts being re-opened during the intake stroke after it is opened during the exhaust stroke and then closed once. This provides an advantage of being able to adequately prevent a problem such as jumping.

Figure 10:
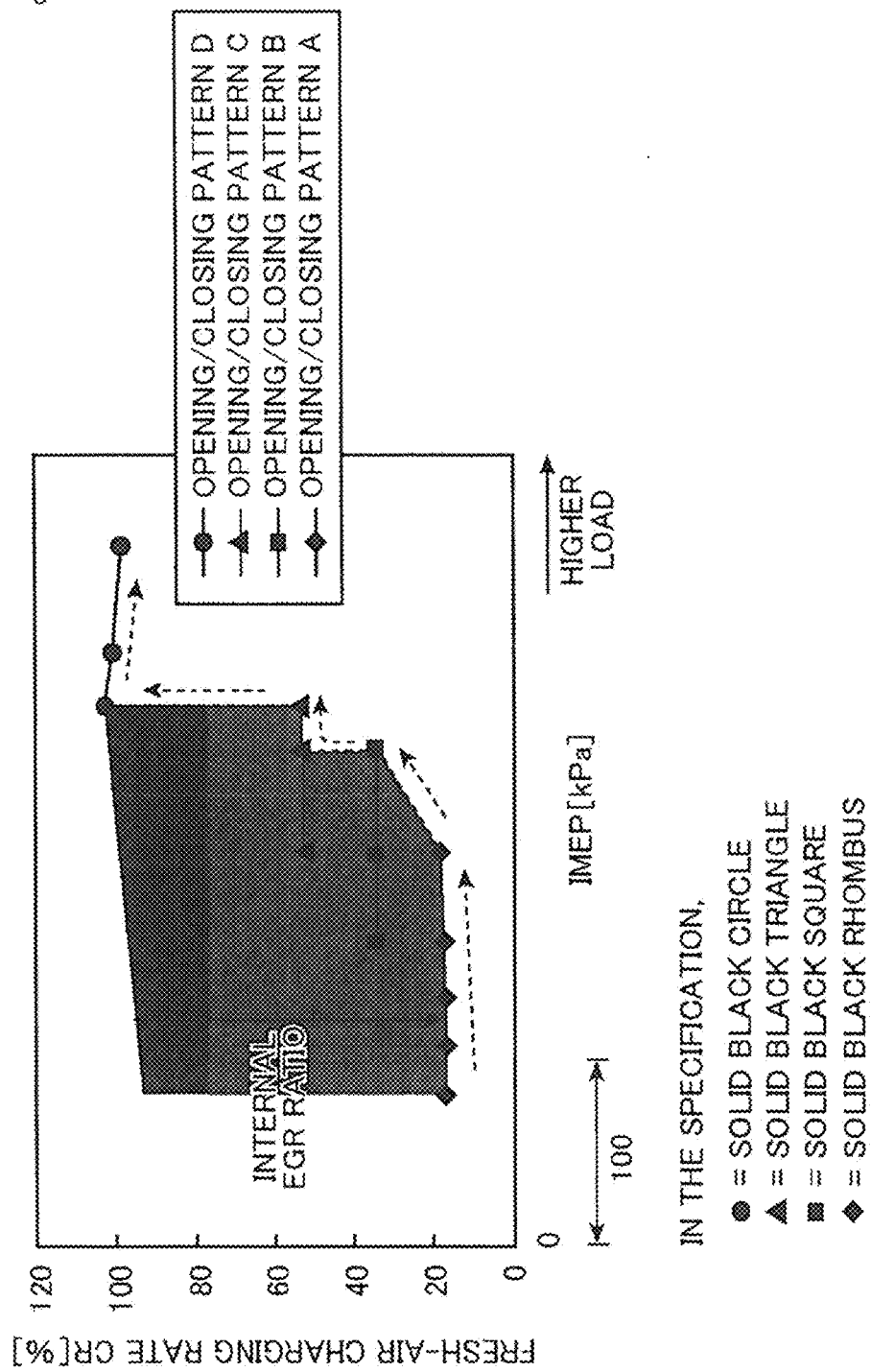
FIG. 10 is a graph showing a measurement result of a fresh-air charging rate obtained when intake and exhaust valves were controlled according to each of the opening/closing patterns.

FIG. 10 is a graph showing a result of an experimental test carried out by the inventors of the present invention to verify the above advantageous effects. An engine used in the test had a geometric compression ratio of 20 and a bore*stroke of 87.5*83.1. The engine was operated in the HCCI combustion mode, and a fresh-air charging rate (charging efficiency) CR was measured during the operation. During the measurement, the engine speed Ne was maintained at 1000 rpm, and a temperature of intake air was maintained at 50 degrees Celsius.

Each of the marks "solid black rhombus", "solid black square", "solid black triangle", "solid black circle" plotted on the graph of FIG. 10 indicates a value of the fresh-air charging rate CR obtained when the intake and exhaust valves 11, 12 were controlled according to the opening/closing patterns illustrated in FIGS. 6 to 9. Specifically, the mark "solid black rhombus", the mark "solid black square", the mark "solid black triangle" and the mark "solid black circle" indicate values obtained according to the opening/closing pattern A (FIG. 6), the opening/closing pattern B (FIG. 7), the opening/closing pattern C (FIG. 8) and the opening/closing pattern D (FIG. 9), respectively. Among them, the plot "solid black square" for the opening/closing pattern B indicates a value of the fresh-air charging rate CR obtained under the condition that the lift amount of the intake valve 11 is increased up to the maximum value as shown in FIG. 7 (i.e., to a value equal to or greater than the lift amount of the exhaust valve 12 opened during the intake stroke).

In the graph of FIG. 10, the horizontal axis represents IMEP (Indicated Mean Effective Pressure) which is an index indicative of a level of the engine load (work). A difference in position in a direction of the horizontal axis between the plots indicates a difference in fuel injection amount depending on the engine load, wherein the fuel injection amount becomes larger as the plot is located at a position closer to a right end of the graph.

As seen in the graph of FIG. 10, the fresh-air charging rate CR becomes higher in a stepwise manner in the following order: the opening/closing pattern A, B, C and D. Specifically, the fresh-air charging rate CR is just below 20% in the opening/closing pattern A, whereas it increases up to over 30% in the opening/closing pattern B, over 50% in the opening/closing pattern C, and about 100% in the opening/closing pattern D. The plot "solid black square" for the opening/closing pattern B indicates a value of the fresh-air charging rate CR obtained under the condition that the lift amount of the intake valve 11 is increased up to the maximum value, as mentioned above. Thus, when the lift amount becomes less than the maximum value, a value of the fresh-air charging rate CR obviously becomes less than the plot "solid black square", and becomes closer to a value of the plot "solid black rhombus" for the opening/closing pattern A.

Further, the gray region in the graph after excluding a fresh air region indicates an amount of internal EGR gas introduced into the cylinder 2. Contrary to the fresh air, a rate of the internal EGR gas (internal EGR ratio) is reduced in a stepwise manner in the following order: the opening/closing pattern A, B, C and D. An upper edge of the gray region indicating the internal EGR ratio inclines leftwardly and downwardly, because a gas density becomes lower as the internal EGR amount becomes larger.

As evidenced by the above test result, when the opening/closing patterns for the intake and exhaust valves 11, 12 are changed along with an increase in the engine load as indicated by the arrowed broken line in the graph in the following order: the pattern A, B, C and D (i.e., when the same control operation as that in the above embodiment is performed), the in-cylinder fresh-air amount can be increased while reducing the internal EGR amount, in a stepwise manner along with an increase in the engine load. Specifically, in the opening/closing pattern A, the internal EGR gas is maximally introduced to raise the in-cylinder temperature. Then, when the engine load increases from this state, the opening/closing pattern is shifted to B, C, and D depending on the engine load, so that the internal EGR amount can be reduced to suppress the in-cylinder temperature, while increasing the in-cylinder fresh-air amount, in a stepwise manner.

FIG. 11 shows a result of an experimental test carried out to verify a combustion state when the engine is operated under the same conditions as those in FIG. 10, wherein a position of the combustion center of gravity of the vertical axis represents a crank angle at a time when 50% of a fuel mass has been burnt (50% MB). According to the graph in FIG. 11, it is proven that a position of the combustion center of gravity in any case of the opening/closing patterns A, B, C, D generally falls within an adequate range P on a retard side with respect to the compression TDC (0 degree CA). As a result, it was verified that the HCCI combustion can be continuously performed in an adequate manner, regardless of the engine load, by shifting the opening/closing pattern: A, B, C and D, along with an increase in the engine load.

Although the above test results were obtained using a high-compression engine having a geometric compression ratio of 20, the same results can also be obtained using an engines having a geometric compression ratio higher than a certain level. However, in view of effectively utilizing the feature in the above embodiment, i.e., the mechanism for opening the exhaust valve 14 during the intake stroke to perform the internal EGR (operation of causing burned gas to flow back into the cylinder), it is desirable to set the geometric compression ratio to 15 or more.

For example, a similar function of the operation of introducing burned gas into the cylinder 2 can also be achieved by providing a time period where both the intake valve 11 and the exhaust valve 12 are closed, between a halfway point of the exhaust stroke and the halfway point of the intake stroke (so-called "negative overlap period"), and there has heretofore been proposed a technique of raising the in-cylinder temperature by an operation of causing burned gas to remain in the cylinder 2 based on the negative overlap period, so as to enhance auto-ignitability of the air-fuel mixture. However, if both of the intake and exhaust valves 11, 12 are closed from the halfway point of the exhaust stroke, high-temperature burned gas remaining in the cylinder 2 is compressed and the temperature thereof is further raised, so that a large amount of heat will be released outside (i.e., cooling loss is increased), which is likely to cancel the effect of raising the in-cylinder temperature around the subsequent exhaust TDC.

This risk is increased as an engine has a higher compression ratio. More specifically, when the operation of introducing burned gas into the cylinder 2 by means of the negative overlap period is termed "NVO (Negative Valve-Overlap)-type EGR", and the operation of introducing burned gas into the cylinder 2 by opening the exhaust valve 12 during the intake stroke is termed "EVRO (Exhaust-Valve Re-Opening)-type EGR", according to the inventors' researches, it has been verified that a rising amount of the in-cylinder temperature in the NVO-type EGR is lower than that in the EVRO-type EGR, under a condition that the same amount of internal EGR gas is ensured in each of the types, and a lowering rate of the rising amount of the in-cylinder temperature is increased as the compression ratio becomes higher. For example, in an experimental test for comparing between the NVO-type EGR and the EVRO-type EGR in terms of the in-cylinder temperature at the compression TDC under certain conditions, a difference in the in-cylinder temperature between the types was about 20 degrees Celsius in an engine having a geometric compression ratio of 15, and it was significantly increased to about 50 degrees Celsius in an engine having a geometric compression ratio of 20. On the other hand, in an engine having a geometric compression ratio of 10, such a significant difference in the in-cylinder temperature was not observed.

In view of the above results, it can be said that the EVRO-type EGR is capable of suppressing the cooling loss to a lower level, and advantageous in terms of ignitability and efficiency, as compared with the NVO-type EGR. Further, it can be said that the above advantage of the EVRO-type EGR is significantly exhibited in an engine having a geometric compression ratio of 15 or more, and the advantage or superiority is increased as the geometric compression ratio becomes higher than 15.

However, when the geometric compression ratio is increased, there are limits from a practical stand point. Specifically, even if the geometric compression ratio is increased more than is necessary, a resulting effect will gradually reduce. Considering this point, it is preferable that the geometric compression ratio is set to 22 or less.

Therefore, in an engine having a geometric compression ratio of 15 to 22, the EVRO-type EGR is performed, and the intake and exhaust valves 11, 12 are controlled according to the opening/closing patterns A to D depending on the engine load. This makes it possible to adequately perform the highly efficient HCCI combustion over a wide engine load range while sufficiently utilizing the advantage of the EVRO-type EGR.

(5) Modifications/Changes

In the above embodiment, in the first load zone R1 having the lowest engine load in the HCCI region R where the HCCI combustion is performed, the opening/closing pattern A illustrated in FIG. 6 is selected to open both of the pair of intake valves 11 provided in each of the cylinders, at a relatively low lift, and open the pair of exhaust valves 12, during the intake stroke. Alternatively, the first load zone R1 may be further divided into two sub-zones, and, in a low engine load-side one of the two sub-zones, the number of the intake valves 11 to be opened during the intake stroke may be reduced to one. Specifically, when the low engine load-side one of the two sub-zones of the first load zone R1 is termed "first low load zone", and the other sub-zone on the high engine load side is termed "second low load zone", the number of the intake valves 11 to be opened during the intake stroke in the first low load zone is set to one, and the number of the intake valves 11 to be opened during the intake stroke in the second low load zone is set to two. As a result, the number of the intake valves 11 to be opened during the intake stroke is set to one, only in the first low load zone, and set to two, in the entire remaining part of the HCCI region (second low load zone, and the second, third and fourth load zones R2, R3, R4) in which the engine load is higher than in the first low load zone. This makes it possible to further reduce the in-cylinder fresh-air amount to further increase the internal EGR ratio, in an extremely low engine load range close to no engine load, such as the first low load zone.

In the above embodiment, in the second load zone R2 which has the second-lowest engine load in the HCCI region R, the lift amount of the intake valve 11 is gradually increased along with an increase in the engine load (the opening/closing pattern in FIG. 7), to obtain the lift curves as indicated by IN1, IN2 in FIG. 7 when the engine load maximally increases in the second load zone R2. Alternatively, the second load zone R2 may be further expanded toward the high load side, and the lift amount of the intake valve 11 may be further increased as compared with that in FIG. 7 to largely retard the closing timing of the intake valve 11 with respect to the intake BDC. Thus, a substantial compression start timing is retarded to cause a reduction in effective compression ratio. This makes it possible to lower the in-cylinder temperature from a state before retarding the closing timing of the intake valve 11 to obtain the same effect as that from a reduction in the internal EGR amount.

In the above embodiment, the pair of intake valves 11 and the pair of exhaust valves 12 are provided in each of the cylinders 2. However, each of the number of the intake valves 11 and the number of the exhaust valves 12 is not limited to two, but at least one of the number of the intake valves 11 and the number of the exhaust valves 12 may be set to one per cylinder. For example, in cases where the number of the exhaust valves 12 is set to one per cylinder, the one exhaust valve 12 may be opened during the intake stroke in each of the first and second load zones R1, R2 (the opening/closing patterns A, B), and, when the engine load increases beyond the second load zone R2, the valve-opening operation of the exhaust valve 12 may be inhibited to set the number of the exhaust valves 12 to be opened during the intake stroke, to zero (the opening/closing pattern D). Thus, in cases where the number of the exhaust valves 12 is set to one per cylinder, the number of opening/closing patterns is at least three.

Alternatively, at least one of the number of the intake valves 11 and the number of the exhaust valves 12 may be set to three or more per cylinder. For example, in cases where the number of the exhaust valves 12 is set to three per cylinder, the number of the exhaust valves 12 to be opened during the intake stroke may be reduced along with an increase in the engine load in the following manner: 3, 2, 1 and 0. This makes it possible to more finely adjust the in-cylinder fresh-air amount and the internal EGR amount.

(6) Outline

An outline of features and effects of the present invention disclosed based on the above embodiment will be described below. An engine control system of the present invention is designed to allow homogeneous-charge compression ignition combustion to be performed in an HCCI region defined as an engine operating region including at least a partial-load range of an engine. The engine control system comprises: a variable lift mechanism adapted to variably set a lift amount of an intake valve; a switching mechanism adapted to be capable of switching between allowing an exhaust valve to be opened both during an exhaust stroke and during an intake stroke, and allowing the exhaust valve to be opened only during the exhaust stroke; and a valve controller adapted to drive the variable lift mechanism and the switching mechanism to control respective opening/closing operations of the intake valve and the exhaust valve. In the engine control system, the HCCI region is divided into a plurality of load zones including a low load zone, and a medium load zone in which the engine load is higher than in the low load zone. The valve controller is operable; in the low load zone of the HCCI region, to set the lift amount of the intake valve to a first predetermined value and allow the exhaust valve to start being opened during the intake stroke at a given timing later than an opening timing of the intake valve; and, in the medium load zone of the HCCI region, to gradually increase the lift amount of the intake valve up to a second predetermined value greater than the first predetermined value, along with an increase in the engine load.

In the engine control system of the present invention, in the low load zone of the HCCI region, the exhaust valve is opened during the intake stroke, and the lift amount of the intake valve is set to a relatively small value (first predetermined value), so that it becomes possible to cause burned gas discharged once to flow back into a cylinder in a large amount, to relatively reduce a ratio of fresh air to a total gas amount in the cylinder. Consequently, an in-cylinder temperature is significantly raised to create an environment where an air-fuel mixture is more likely to be auto-ignited. This makes it possible to reliably induce the HCCI combustion even in a situation where the engine load is low and thereby an fuel injection amount is small.

Further, in an engine load range higher than the low load zone (in the medium load zone), the lift amount of the intake valve is increased along with an increase in the engine load, so that it becomes possible to adequately adjust a ratio between burned gas and fresh air in the cylinder, depending on the engine load, and continuously perform the HCCI combustion in an adequate manner even in a situation where the engine load increases to a certain level.

As for a control target value of the lift amount of the intake valve (first and second predetermined values), the first predetermined value may be set to be less than a lift amount of the exhaust valve opened during the intake stroke, and the second predetermined value may be set to be equal to or greater than the lift amount of the exhaust valve opened during the intake stroke.

The HCCI region may include the low load zone, the medium load zone, and a high load zone in which the engine load is higher than in the medium load zone. In this case, it is preferable that the valve controller is operable, in the high load zone, to inhibit the exhaust valve from being opened during the intake stroke to set the number of the exhaust valves to be opened during the intake stroke, to zero.

According to this feature, in the high load zone of the HCCI region, the number of the exhaust valves to be opened during the intake stroke is set to zero to stop backflow of burned gas, so that it becomes possible to ensure a sufficient amount of in-cylinder fresh air suitable for a high engine load, and suppress the in-cylinder temperature to a low level to effectively prevent abnormal combustion such as preignition.

More preferably, in the above engine control system, the engine has a plurality of the exhaust valves per cylinder, and the medium load zone of the HCCI region includes a first medium load zone, and a second medium load zone in which the engine load is higher than in the first medium load zone, wherein the valve controller is operable: in the low load zone of the HCCI region, to allow all of the exhaust valves to be opened during the intake stroke; in the first medium load zone of the HCCI region, to gradually increase the lift amount of the intake valve along with an increase in the engine load; in the second medium load zone of the HCCI region, to inhibit a part of the exhaust valves from being opened during the intake stroke so as to reduce the number of the exhaust valves to be opened during the intake stroke; and, in the high load zone of the HCCI region, to inhibit all of the exhaust valves from being opened during the intake stroke so as to set the number of the exhaust valves to be opened during the intake stroke, to zero.

According to this feature, the plurality of exhaust valves are provided per cylinder, and the number of the exhaust valves to be opened during the intake stroke is set to a total number of the exhaust valves, in the low load zone. The number is gradually reduced along with an increase in the engine load, and finally set to zero in the high load zone. This provides an advantage of being able to more finely control an amount of burned gas to be introduced into the cylinder, depending on the engine load.

Preferably, in the engine control system of the present invention, the exhaust valve is designed such that, when it is opened during the intake stroke, a position of a peak lift thereof is located in a later phase of the intake stroke.

According to this feature, the exhaust valve is largely opened at a timing when the cylinder is more likely to have a negative pressure. This makes it possible to efficiently introduce burned gas discharged once, into the cylinder.

In cases where the engine has a plurality of the intake valves per cylinder, the engine control system may be configured such that the low load zone of the HCCI region includes a first low load zone, and a second low load zone in which the engine load is higher than in the first low load zone, wherein the valve controller is operable, in the first low load zone, to set the number of the intake valves to be opened during the intake stroke, to one, and, in the second low load zone and a remaining part of the HCCI region in which the engine load is higher than in the second low load zone, to increase the number of the intake valves to be opened during the intake stroke, to two or more.

According to this feature, the number of the intake valves to be opened during the intake stroke is reduced in an extremely low engine load range, such as the first low load zone. This makes it possible to further reduce the in-cylinder fresh-air amount to further increase an internal EGR ratio, in the extremely low engine load range.

Preferably, in the engine control system of the present invention, the engine has a geometric compression ratio of 15 to 22.

When the engine control system of the present invention is used in an engine having a relatively high geometric compression ratio set to the above value, it becomes possible to adequately perform the highly efficient HCCI combustion over a wide engine load range while sufficiently utilizing an advantage of the mechanism of opening the exhaust valve during the intake stroke to introduce burned gas into the cylinder (so called "exhaust valve re-opening type EGR").

This application is based on Japanese Patent application No. 2010-082552 filed in Japan Patent Office on Mar. 31, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An engine control system designed to allow homogeneous-charge compression ignition combustion to be performed in an HCCI region defined as an engine operating region including at least a partial-load range of an engine, comprising:
   a variable lift mechanism adapted to variably set a lift amount of an intake valve;
   a switching mechanism adapted to be capable of switching between allowing an exhaust valve to be opened both during an exhaust stroke and during an intake stroke, and allowing the exhaust valve to be opened only during the exhaust stroke; and
   a valve controller adapted to drive the variable lift mechanism and the switching mechanism to control respective opening/closing operations of the intake valve and the exhaust valve,
   wherein the HCCI region is divided into a plurality of load zones including a low load zone, and a medium load zone in which the engine load is higher than in the low load zone,
   and wherein the valve controller is operable:
   in the low load zone of the HCCI region, to set the lift amount of the intake valve to a first predetermined value and allow the exhaust valve to start being opened during the intake stroke at a given timing later than an opening timing of the intake valve; and
   in the medium load zone of the HCCI region, to gradually increase the lift amount of the intake valve up to a second predetermined value greater than the first predetermined value, along with an increase in the engine load.

2. The engine control system as defined in claim 1, wherein:
   the engine has a plurality of the exhaust valves per cylinder; and
   the medium load zone of the HCCI region includes a first medium load zone, and a second medium load zone in which the engine load is higher than in the first medium load zone,
   and wherein the valve controller is operable:
   in the low load zone of the HCCI region, to allow all of the exhaust valves to be opened during the intake stroke;
   in the first medium load zone of the HCCI region, to gradually increase the lift amount of the intake valve along with an increase in the engine load;
   in the second medium load zone of the HCCI region, to inhibit a part of the exhaust valves from being opened during the intake stroke so as to reduce the number of the exhaust valves to be opened during the intake stroke; and
   in the high load zone of the HCCI region, to inhibit all of the exhaust valves from being opened during the intake stroke so as to set the number of the exhaust valves to be opened during the intake stroke, to zero.

3. The engine control system as defined in claim 1, wherein the exhaust valve is designed such that, when it is opened during the intake stroke, a position of a peak lift thereof is located in a later phase of the intake stroke.

4. The engine control system as defined in claim 1, wherein:
   the engine has a plurality of the intake valves per cylinder; and
   the low load zone of the HCCI region includes a first low load zone, and a second low load zone in which the engine load is higher than in the first low load zone,
   and wherein the valve controller is operable, in the first low load zone, to set the number of the intake valves to be opened during the intake stroke, to one, and, in the second low load zone and a remaining part of the HCCI region in which the engine load is higher than in the second low load zone, to increase the number of the intake valves to be opened during the intake stroke, to two or more.

5. The engine control system as defined in claim 1, wherein a geometric compression ratio of the engine is set in a range of 15 to 22.

* * * * *